H. J. CARY-CURR.
EXTRACTION APPARATUS.
APPLICATION FILED AUG. 20, 1913.

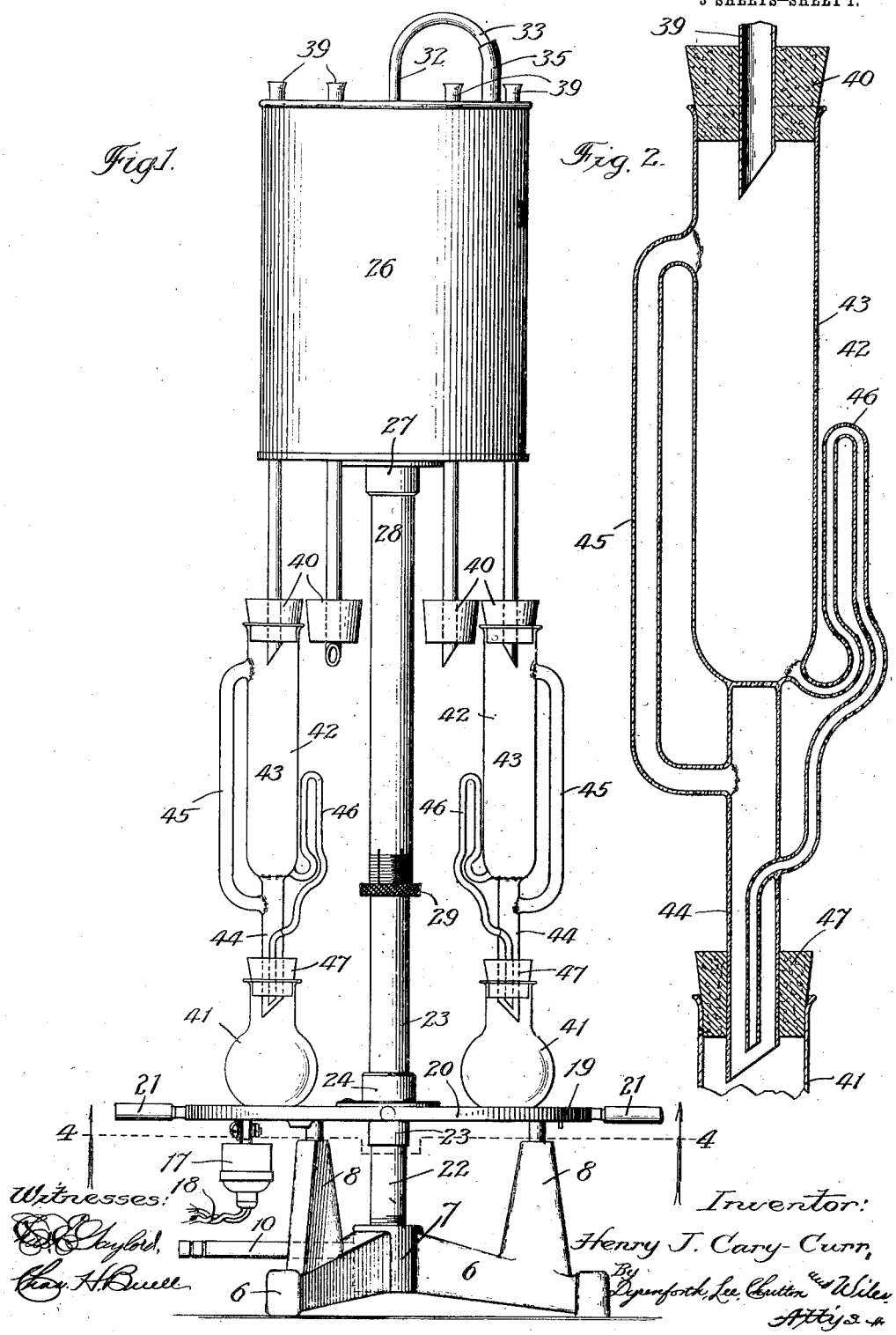

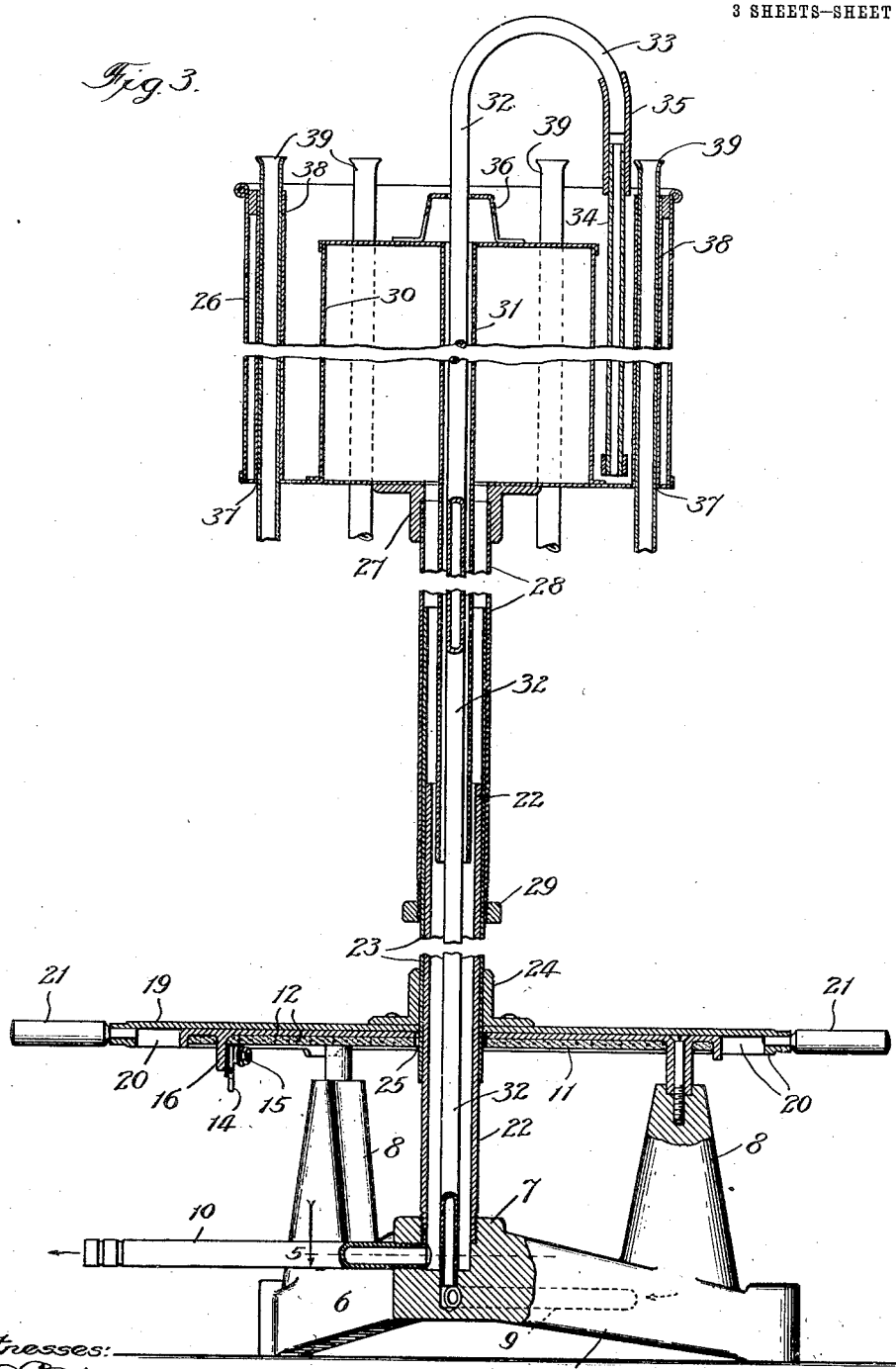

1,082,304.

Patented Dec. 23, 1913.

3 SHEETS—SHEET 3.

Witnesses:

Inventor:
Henry J. Cary-Curr,
By Dyrenforth, Lee, Chritton & Wiles,
Attys.

UNITED STATES PATENT OFFICE.

HENRY J. CARY-CURR, OF CHICAGO, ILLINOIS, ASSIGNOR TO E. H. SARGENT & CO., OF CHICAGO, ILLINOIS, A CORPORATION OF ILLINOIS.

EXTRACTION APPARATUS.

1,082,304.  Specification of Letters Patent.  Patented Dec. 23, 1913.

Application filed August 20, 1913. Serial No. 785,671.

*To all whom it may concern:*

Be it known that I, HENRY J. CARY-CURR, a subject of the King of Great Britain, residing at Chicago, in the county of Cook and State of Illinois, have invented new and useful Improvements in Extraction Apparatus, of which the following is a specification.

My invention relates to an improvement in the class of apparatus, more especially for laboratory use, which is known in the art as "ether-extraction apparatus," and is employed for extracting extractive matter from substances containing it, by the solvent and so-called washing actions of volatile solvents, such as ether, chloroform, benzin, carbon-tetrachlorid, carbon-bisulfid, gasolene, or the like, depending upon the particular substance to be treated.

Apparatus of the kind referred to involves a plurality of means for treating, simultaneously in some or each of them, substances containing matter to be extracted; and the primary object of my improvement is to provide the apparatus in very compact form to occupy the minimum of space, by constructing it to be revoluble on its hot-plate base, and thus render any substance under treatment conveniently accessible by bringing it, from any position in the apparatus, immediately in front of the user.

Figure 4:
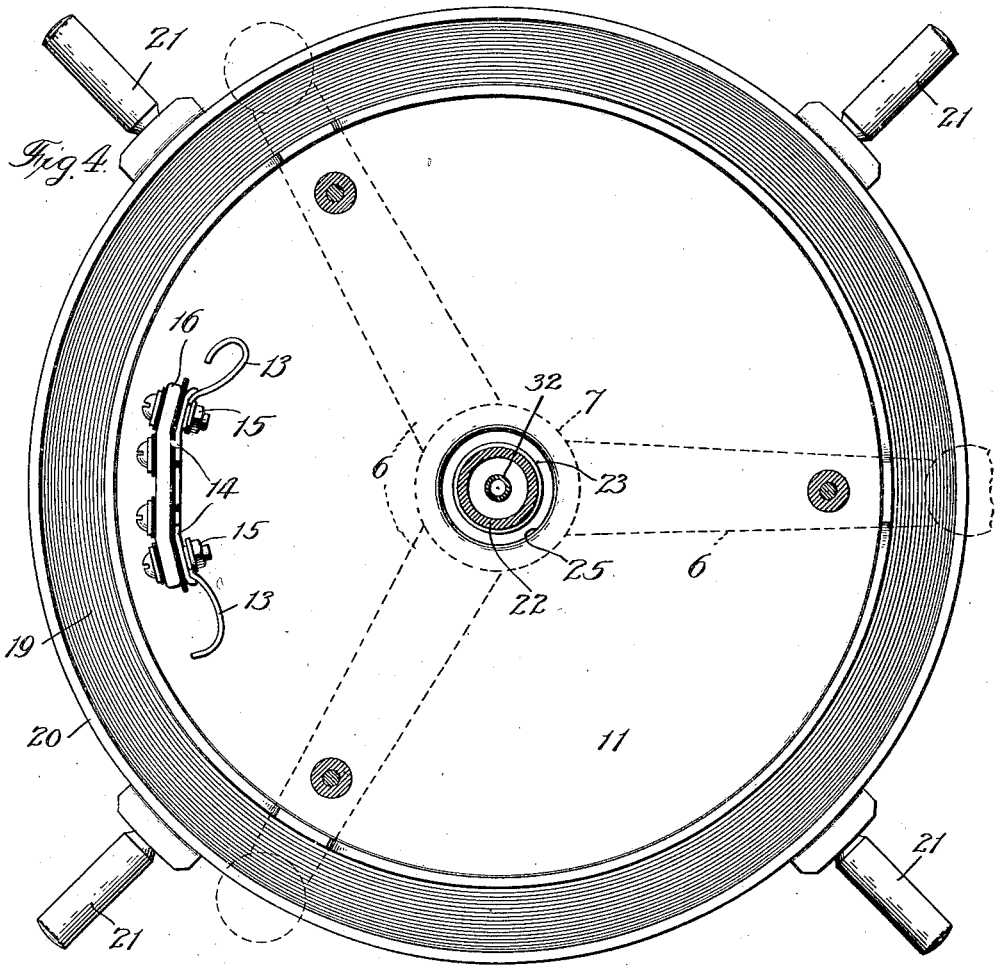
Figure 5:
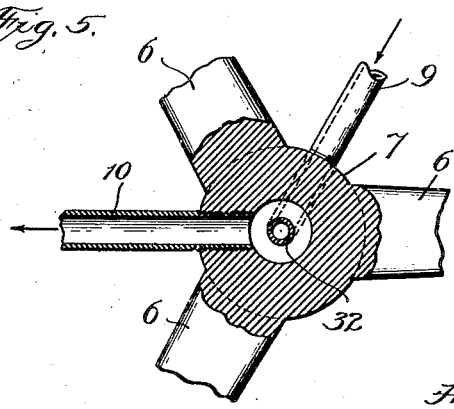

In the accompanying drawings, Figure 1 is a view in elevation of my apparatus showing the embodiment of my invention in its approved and preferred form; Fig. 2 is a broken view in sectional elevation showing a known form of glass extractor used in the apparatus; Fig. 3 is a broken view in vertical sectional elevation of the apparatus with the extractors and flasks removed; Fig. 4 is an enlarged section on the irregular line 4—4, Fig. 1, and Fig. 5 is an enlarged broken section on line 5, Fig. 3.

The supporting-stand or base of the apparatus is shown as a plurality of feet 6 extending from a central hollow hub 7 and having short posts 8 rising from them. A supply-pipe 9 for the condensing water leads into the hub, and a discharge-pipe 10 for the water leads therefrom and is of larger diameter than that of the supply-pipe. To the upper ends of the posts is secured a hot-plate 11. It is preferred, but not essential, that the hot-plate be one of the kind adapted to be electrically heated; and that shown, therefore, which is of disk-shape and of well-known general construction, consists of an electrical resistance element 12 embedded in refractory material and having relatively-heavy insulated terminal-wires 13 connected with its ends to project at the bottom of the plate, where they are connected to metal contact-members 14 by binding-posts 15 fastening them to a flange 16 on the bottom of the hot-plate, and between which and the contact-members a strip of insulating material is interposed. The contact-members depend into and are confined in a suitable head 17, wherein they are connected with insulated wires in a cable 18 carrying on its distal end (not shown) an ordinary plug for insertion into the socket of an incandescent electric lamp. On the stationary hot-plate 11 is rotatably mounted a supplemental metal hot-plate 19, shown of disk-form, with a depending circumferential flange 20 carrying, at intervals, handles 21 of heat-insulating material, by which to turn the rotary plate.

A stand-pipe 22 is screwed into the top of the hub and communicates with the discharge-pipe 10. A pipe 23, into which the stand-pipe telescopes, has a flanged collar 24 secured about it and fastened through the flange to the top of the supplemental plate about a central opening therein, through which the pipe 23 extends, as it also does through the stationary hot-plate at a central opening 25 therein, but of greater diameter than the pipe to avoid conductively transmitting to the latter heat from the plate 11.

A tank 26 having a central opening in its bottom, has fastened on the latter a flanged collar 27 about the opening. A pipe 28 depends from this collar to overlap telescopically the pipe 23; and it is screw-threaded about its lower-end portion and there slitted at intervals, as shown in Fig. 1, to adapt it to be releasably clamped about the pipe 23 by means of a nut 29 having a tapered thread. An inverted cup 30 is contained in the tank concentrically therewith, being sealed about its lower edge to the tank-bottom and extending short of the top of the tank. A pipe 31, which is sealed in a central opening in the upper end of the cup, depends through the tank-bottom centrally into the pipes 28, 22. A pipe 32, of relatively-small diameter, terminating at its upper end in a goose-neck 33, having a pipe-section 34 suspended from it by a flexible coupling 35, to reach nearly to the bottom of the tank, extends through a guide 36 on the upper end of the cup through the pipes 31 and 32 into the hub 7 and communicates at its lower end with the inner end of the water-supply pipe 9.

A plurality of openings 37 are provided in a circular series and at uniform distances apart in the bottom of the tank, and each opening is sealed by the lower end of a guide-sleeve 38. In these guide-sleeves, are frictionally supported, to be raised and lowered and stay in adjusted position, open-ended condenser-tubes 39, of a length greater than the height of the tank and provided with beveled lower drip-ends; and tapering stoppers 40, preferably cork of superior quality, are frictionally held about the lower ends of the condenser-tubes.

It will be observed that vertical movement of the condenser-tubes 39 carries the stoppers 40 to insert them into and withdraw them from the extractors 42, hereinafter more definitely specified, and that there is, therefore, never any need for moving the corks on the tubes. This is of advantage, since such handling of the corks tends to strain and break them, thereby impairing them and rendering them unfit for use; and as these corks are of superior quality and therefore more or less rare and expensive, it is highly desirable to preserve them against impairment.

The pipe 28, upon loosening the nut 29, may be adjusted telescopically to place the tank 26 at the desired height relative to the length of the extractor to require only more or less slight setting of the condenser-tubes in adjusting the stoppers therein into or raising them from the flasks. On clamping the pipe 28 to the pipe 23, which latter is fast with the rotary hot-plate 19, the flasks and extractor-members and the tank with its contained condenser-tubes and cup 30 all rotate about a central axis by rotating the supplemental hot-plate.

Cold water flows through the supply-pipe 9, and by way of the pipes 32 and 34, into the bottom of the elevated tank to fill the latter for cooling the condenser-tubes and overflow the upper end of the cup 30 to escape down the pipe 31 and stationary pipe 22 overlapping the latter, and discharge out of the apparatus through the pipe 10. With the stationary plate 11 suitably heated, it heats the rotary plate 19, the heat from which volatilizes the solvent in each flask supplied with the same. The parts denoted in Figs. 1 and 2 respectively by the reference-numerals 41, 43, 44, 45, 46 and 47 constitute the well-known "Soxhlet extractor" 42. The vapors rise through the by-pass 45 into the upper end of the body 43, whence they ascend into the respective tube 39 to be condensed therein by the water in the tank and flow back into the respective body 43, dripping into the latter from the beveled end of the condenser-tube. When the liquid of condensation accumulates in a member 43 to an extent which raises its level above the upper end of the tube 46, the latter siphons it out and returns it, for repeated use, into the flask 41.

The salient feature of my improvement lies in the compactness of the structure, which is rendered practically possible by the rotatable supplemental hot-plate carrying the tank and parts thereon to rotate with it; other fittings being constructed to coöperate properly in the rotatable apparatus.

When the plate 11 is of the type illustrated, adapting it to be electrically heated, the rotatory plate 19 affords the added advantage of shielding the electrical connections against coming into contact with and becoming entangled and injured by the user. By rotating the plate 19, any flask may be readily brought to convenient position for handling by the operator, to remove and replace it without interrupting the operation of the apparatus on the other flasks. The pipe-support for the tank-containing condenser-tubes forms a hollow rotary standard.

The cup 30 is, in a sense, a mere dummy, but affords a convenient device for its purpose in reducing the capacity of the tank for holding the condenser-water. It is not, however, an essential feature of my improved apparatus; nor, in fact, is the tank itself, since any other means suitable for supplying condenser-water about the tubes 39 may be used. I realize, moreover, that considerable variation, in other particulars, is possible in the details of construction thus specifically shown and described, and I do not intend by illustrating a single, specific or preferred embodiment of my invention to be limited thereto; my intention being in the following claims to claim protection upon all the novelty there may be in my invention as broadly as the state of the art will permit.

What I claim as new and desire to secure by Letters Patent is—

1. An extraction-apparatus of the character described, having a stationarily-supported hot-plate, and a rotatably-supported supplemental hot-plate covering said stationary plate to be heated thereby and forming the extractor-support.

2. An extraction-apparatus of the character described, having a base, an electrically-heated hot-plate secured on said base, and a flanged supplemental hot-plate rotatably mounted on said stationary plate to be heated thereby and forming the extractor-support.

3. An extraction-apparatus of the character described, having a base, a hot-plate secured on said base, a supplemental hot-plate rotatably supported to cover and be heated by said stationary plate and forming the extractor-support, a standard rising through said plates from said base, having a rotatable upper portion secured to said supplemental plate, and condenser-tubes supported at the upper end of said standard to rotate therewith.

4. An extraction-apparatus of the character described, having a base, a hot-plate secured on said base, a supplemental hot-plate rotatably mounted on said stationary plate to be heated thereby and forming the extractor-support, a hollow standard rising through said plates from said base, having a rotatable upper section secured to said supplemental plate and telescopically connected with the lower standard-section to render the standard extensible and contractible, and condenser-tubes supported at the upper end of said standard to rotate therewith.

5. An extraction-apparatus of the character described, having a base provided with a hollow hub, a cold-water supply-pipe leading into and a discharge-pipe leading out of the hub, a hot-plate secured on said base, a supplemental hot-plate rotatably supported to cover and be heated by said stationary plate and forming the extractor-support, a hollow standard rising through said plates from said hub in which it communicates with said discharge-pipe, said standard having a rotatable upper portion secured to said supplemental plate, condenser-tubes supported at the upper end of said standard to rotate therewith, and a pipe leading through said standard for supplying condenser-water to said tubes to escape through the hollow standard to said discharge-pipe.

6. An extraction-apparatus of the character described, having a base, a hot-plate secured on said base, a supplemental hot-plate rotatably mounted on said stationary plate to be heated thereby and forming the extractor-support, a standard rising through said plates from said base, having a rotatable upper section secured to said supplemental plate, and telescopically connected with the lower standard-section to render the standard extensible and contractible, guide-sleeves supported at the upper end of said standard to rotate therewith, and condenser-tubes adjustably supported in the guide-tubes.

7. An extraction-apparatus of the character described, having a base, a hot-plate secured on said base, a supplemental hot-plate rotatably mounted on said stationary plate to be heated thereby and forming the extractor-support, a hollow standard comprising a lower section rising from said base, an intermediate section passing through said plates in telescopic connection with the lower section and to which said supplemental plate is secured, and an upper section in telescopic connection with the intermediate section, having its lower end slotted and externally screw-threaded and provided with a clamping-nut, and condenser-tubes supported at the upper end of the standard to rotate therewith.

8. An extraction-apparatus of the character described, having a base, a hot-plate secured on said base, a supplemental hot-plate rotatably mounted on said stationary plate to be heated thereby and forming the extractor-support, a standard rising through said plates from said base, having a rotatable section secured to said supplemental plate, a tank on the upper end of the standard, and condenser-tubes adjustably supported in the tank to protrude through its bottom.

9. An extraction-apparatus of the character described, having a base, a hot-plate secured on said base, a supplemental hot-plate rotatably mounted on said stationary plate to be heated thereby and forming the extractor-support, a standard rising from said base through said plates, having a rotatable section secured to said supplemental plate, a tank on the upper end of the standard, a circumferential series of guide-sleeves in the tank sealed at their ends in openings in the tank-bottom, and condenser-tubes adjustably supported in said guide-tubes to protrude through the tank-bottom.

10. An extraction-apparatus of the character described, having a base, a hot-plate secured on said base, a supplemental hot-plate rotatably mounted on said stationary plate to be heated thereby and forming the extractor-support, a telescopically-adjustable standard rising through said plates from said base, having a rotatable section secured to said supplemental plate, a tank on the upper end of the standard, and condenser-tubes supported in the tank and longitudinally adjustable through the bottom thereof.

11. An extraction-apparatus of the character described, having a base provided with a hollow hub, a supply-pipe leading into and a discharge-pipe leading from the hub, a hot-plate secured on said base, a supplemental hot-plate rotatably supported on said stationary plate to be heated thereby and forming the extractor-support, a hollow standard formed of telescopically-adjustable sections rising through said plates from said hub, said standard having a rotatable upper section secured to said supplemental plate, a tank on the upper end of the standard containing guide-sleeves sealed at their lower ends in openings in the tank-bottom, condenser-tubes adjustably supported on said sleeves to be protruded through said bottom, an inverted cup in the tank having an opening in its upper end, a discharge-pipe depending from said opening into the standard, and a pipe leading from said supply-pipe through the standard into the tank to supply water thereto for the condenser-tubes.

HENRY J. CARY-CURR.

In presence of—
L. HEISLAR,
O. C. AVISUS.